(12) United States Patent
Piacentile (10) Patent No.: US 10,405,140 B1
(45) Date of Patent: Sep. 3, 2019

(54) VENUE EXPERIENCE MANAGEMENT

(71) Applicant: eVenue LLC, Woodcliff Lake, NJ (US)

(72) Inventor: Joseph Piacentile, Woodcliff Lake, NJ (US)

(73) Assignee: eVenue LLC, Woodcliff Lake, NJ (US)

( * ) Notice: Subject to any disclaimer, the term of this patent is extended or adjusted under 35 U.S.C. 154(b) by 0 days.

(21) Appl. No.: 15/722,452

(22) Filed: Oct. 2, 2017

Related U.S. Application Data (63) Continuation of application No. 14/921,903, filed on Oct. 23, 2015, now Pat. No. 9,781,562.

(Continued)

(51) Int. Cl.
| | |
|---|---|
| *H04W 4/02* | (2018.01) |
| *G06Q 10/02* | (2012.01) |
| *G06Q 20/32* | (2012.01) |
| *G06Q 30/02* | (2012.01) |
| *G06Q 30/06* | (2012.01) |

(Continued)

(52) U.S. Cl.
CPC ........... *H04W 4/023* (2013.01); *H04W 4/025* (2013.01); *H04W 4/38* (2018.02); *G06K 2009/00738* (2013.01); *G06Q 10/02* (2013.01); *G06Q 20/3224* (2013.01); *G06Q 30/0269* (2013.01); *G06Q 30/0635* (2013.01); *G06Q 50/01* (2013.01)

(58) Field of Classification Search
CPC ......... G06K 2009/00738; G06Q 50/01; G06Q 10/0833; G06Q 30/02; G06Q 30/0269; G06Q 30/0255; G06Q 30/06; G06Q 30/0633; G06Q 30/0635; G06Q 20/12; G06Q 20/3224; G06Q 30/0261; G06Q 10/02; G06Q 30/0205; G06Q 30/0601; H04L 67/306; H04L 67/18; H04L 67/22; H04L 12/5865; H04W 4/02; H04W 4/001; H04W 4/021; H04W 4/025; H04W 4/08; H04W 4/023; H04W 4/04; H04W 64/00; H04M 2250/12; H04M 2250/10

See application file for complete search history.

(56) References Cited

U.S. PATENT DOCUMENTS

| 6,473,739 B1* | 10/2002 | Showghi | G06Q 10/02 |
| | | | 705/15 |
| 7,174,308 B2* | 2/2007 | Bergman | G06Q 20/04 |
| | | | 705/27.1 |

(Continued)

*Primary Examiner* — Olumide Ajibade Akonai
(74) *Attorney, Agent, or Firm* — FisherBroyles, LLP; Ariel Reinitz (57) ABSTRACT

Systems and methods are disclosed for venue experience management. In one implementation, one or more inputs originating at one or more sensors of a first device are received at a communication interface of a location determination device, one or more inputs originating at one or more sensors of a second device are received at the communication interface of the location determination device, a processing device of the location determination device processes the one or more inputs originating at the one or more sensors of the first device in relation to the one or more inputs originating at the one or more sensors of the second device to determine a relative proximity of the first device in relation to the second device, and one or more actions are initiated based on the relative proximity of the first device in relation to the second device.

20 Claims, 7 Drawing Sheets

Related U.S. Application Data

(60) Provisional application No. 62/067,960, filed on Oct. 23, 2014.

(51) Int. Cl.
    *G06Q 50/00*     (2012.01)
    *H04W 4/38*     (2018.01)
    *G06K 9/00*     (2006.01)

(56) References Cited

U.S. PATENT DOCUMENTS

| | | | |
|---|---|---|---|
| 9,830,625 B2 * | 11/2017 | Proietti | G06Q 30/0601 |
| 2011/0082747 A1 * | 4/2011 | Khan | G06Q 10/00 |
| | | | 705/14.58 |
| 2013/0246301 A1 * | 9/2013 | Radhakrishnan | G06Q 30/0282 |
| | | | 705/347 |
| 2014/0011522 A1 * | 1/2014 | Lin | H04W 4/023 |
| | | | 455/456.2 |
| 2014/0052551 A1 * | 2/2014 | Bressan | G06Q 30/06 |
| | | | 705/15 |
| 2014/0258100 A1 * | 9/2014 | Pasha | G06Q 50/01 |
| | | | 705/39 |
| 2015/0312264 A1 * | 10/2015 | Ortiz | H04L 63/107 |
| | | | 726/4 |
| 2015/0382144 A1 * | 12/2015 | Lopez | H04W 4/023 |
| | | | 455/456.2 |

* cited by examiner

VENUE EXPERIENCE MANAGEMENT

CROSS-REFERENCE TO RELATED APPLICATIONS

This application is a continuation of U.S. application Ser. No. 14/921,903, filed Oct. 23, 2015, which is related to and claims the benefit of U.S. Patent Application No. 62/067,960, filed Oct. 23, 2014 which is incorporated herein by reference in its entirety.

TECHNICAL FIELD

Aspects and implementations of the present disclosure relate to data processing, and more specifically, to venue experience management.

BACKGROUND

Despite the fact that most (if not all) users that attend events, performances, games, etc., at large venues (e.g., arenas, stadiums, theatres, etc.) possess and regularly utilize mobile devices (e.g., smartphones), many aspects of such experiences, particularly in the retail realm, remain inefficient and inconvenient for the user.

SUMMARY

The following presents a simplified summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a simplified form as a prelude to the more detailed description that is presented later.

In one aspect of the present disclosure, one or more inputs originating at one or more sensors of a first device are received at a communication interface of a location determination device, one or more inputs originating at one or more sensors of a second device are received at the communication interface of the location determination device, a processing device of the location determination device processes the one or more inputs originating at the one or more sensors of the first device in relation to the one or more inputs originating at the one or more sensors of the second device to determine a relative proximity of the first device in relation to the second device, and one or more actions are initiated based on the relative proximity of the first device in relation to the second device.

In another aspect of the present disclosure, a processing device receives location information with respect to the presence of a user device within a venue. The processing device processes the location information in relation to at least one of (a) retail data or (b) seating data to identify, based on the location information, one or more purchasing opportunities that are likely to be relevant to the user device. The processing device generates one or more notifications with respect to the one or more purchasing opportunities. The processing device provides the notifications to the user device.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Aspects and implementations of the present disclosure are directed to venue experience management. The systems and methods disclosed can be employed with respect to event venues such as arenas, stadiums, theatres, etc., and/or any other such establishments. More particularly, it can be appreciated that users who attend events (e.g., concerts, games, plays, etc.) at an event venue can be provided with any number of opportunities to make additional purchases while at the event. However, due to various logistical challenges, the process through which such purchases are made is often inefficient and inconvenient for the user. For example, often times long lines or crowds (such as at refreshment counters, souvenir kiosks, etc.) discourage users from making purchases that they would otherwise make. Moreover, even in scenarios in which users make a purchase, certain aspects of such an experience can be inconvenient, such as in the case of a user purchasing a souvenir at the start of an event which much be held or carried by the user throughout the duration of the event.

Additionally, various inefficiencies exist with respect to the manner in which tickets/seats at a venue are allocated. This is particularly true with respect to seats which may go unpurchased or, though purchased, are unused at a particular event. In most cases, once an event begins, those seats that are unsold remain empty and the venue thereby fails to recoup even partial payment for such seats.

Accordingly, described herein in various embodiments are technologies that enable venue experience management. For example, as described herein, a venue operator can utilize information obtained from numerous systems, services, etc., in order to provide an enhanced experience to users present at an event venue. By way of illustration, the location of a particular user can be determined using one or more location determination technologies (e.g., beacons, etc.), as are known to those of ordinary skill in the art. Upon determining a user's location, one or more notifications can be generated and provided to the user. Such notifications can preferably be tailored to the user's interests (as determined based on various purchase histories, venue visit histories, etc.). In doing so, the user can be provided with offers that are likely to be of particular interest to him/her, and the logistical aspects of such purchases (e.g., payment, delivery, etc.) can be coordinated without necessitating waiting on line, etc.

Moreover, in certain implementations the described technologies can interface with various external services such as social networks. In doing so, other users that can be determined to be contacts of or otherwise connected to a user, who may also be present at the venue, can be accounted for. Such connections can be considered, for example, in enabling users who know each other to sit together, despite not initially knowing that both were attending the same event.

Additionally, in certain implementations the described technologies can interface with a seating management system which manages the inventory of available seats/tickets within a venue. In doing so, those seats that are unsold or unused can be monetized by the venue, such as by providing other users the option to upgrade their seats when arriving at the venue, such as is described herein.

At this juncture it should be understood that various implementations of the disclosed technologies provide numerous advantages and improvements upon conventional approaches. By way of example, while existing technologies may enable the location of a user to be determined or tracked, such technologies do not account for various additional contextual aspects associated with such a determination. By way of illustration, the described technologies are configured to enable.

Figure 1:
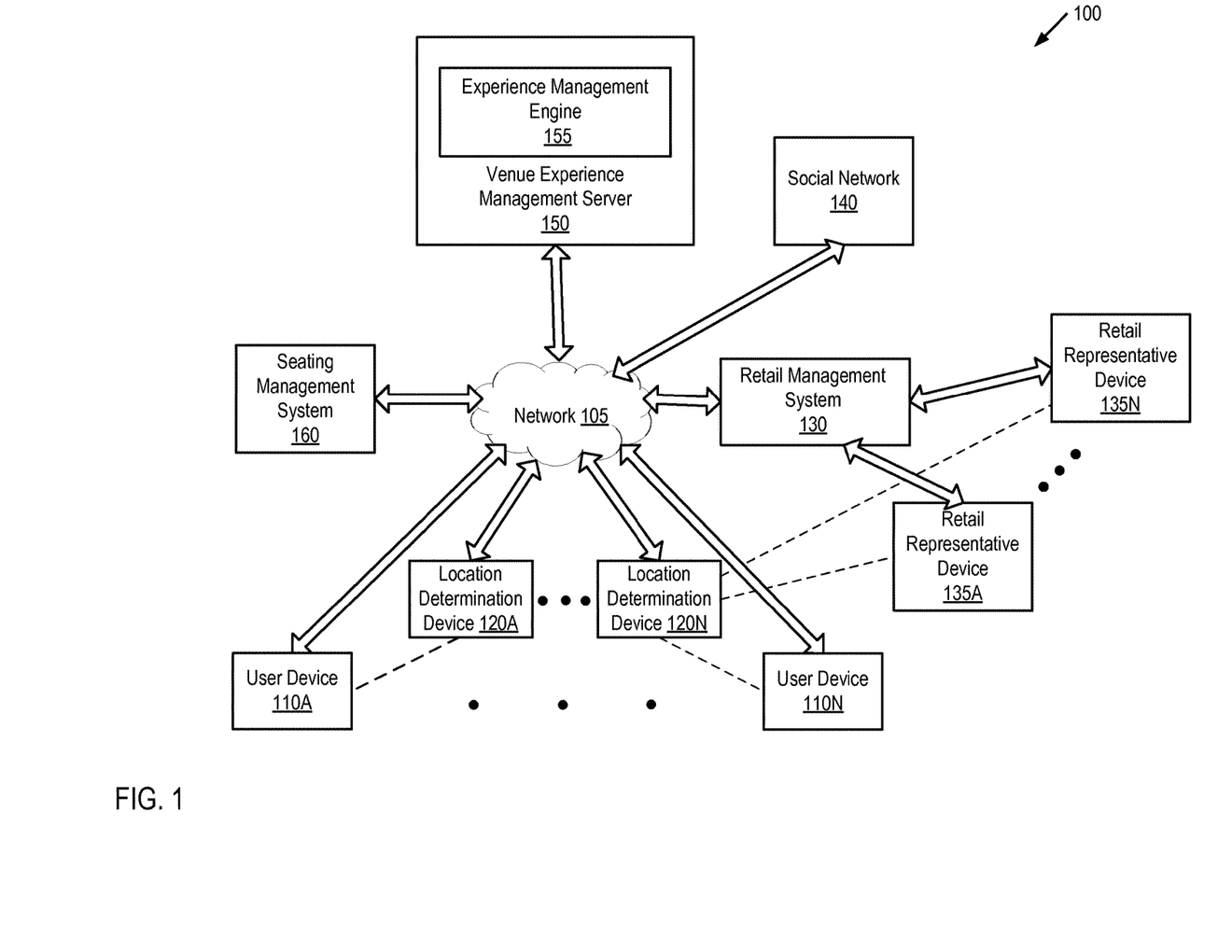
FIG. 1 depicts an illustrative system architecture, in accordance with one implementation of the present disclosure.

FIG. 1 depicts an illustrative system architecture 100, in accordance with one implementation of the present disclosure. The system architecture 100 includes user devices 110, location determination devices 120, retail management system 130, retail representative devices 135, social networks 140, venue experience management server(s) 150, and seating management system(s) 160. These various elements or components can be connected to one another, whether via direct connection and/or via network 105, which can be a public network (e.g., the Internet), a private network (e.g., a local area network (LAN) or wide area network (WAN)), or a combination thereof.

User device(s) 110 can be wireless terminals (e.g., smartphones, etc.), personal computers (PC), laptops, tablet computers, smart watches, wearable devices, an in-vehicle computer/system, a video camera, any combination of the above, or any other such computing device capable of implementing the various features described herein. The user devices 102A-102N may run an operating system (OS) that manages hardware and software of the user devices. Various applications, such as mobile applications ('apps'), web browsers, etc. (not shown) may run on the user devices (e.g., on the OS of the user devices). Such applications can, for example, enable the user to receive information, initiate transactions, etc. The user devices 102A-102N can be geographically distributed anywhere throughout the world. As described herein, in certain implementations the user devices can be present within an event venue such as a stadium, theatre, etc., or a retail establishment (e.g., a store, mall, etc.).

In certain implementations, user device(s) 110 can connect to and/or otherwise be perceived by one or more location determination devices 120. Such devices can enable the determination of the location of one or more user devices with which they are proximate to and/or otherwise in communication. It should be understood that such location determination devices can include, but are not limited to, WiFi access points, Bluetooth transmitters/receivers, beacons (e.g., radio beacons), and/or any other such device or technology that can enable the relative and/or absolute determination of the location of a device (e.g., user device 110).

Figure 6:
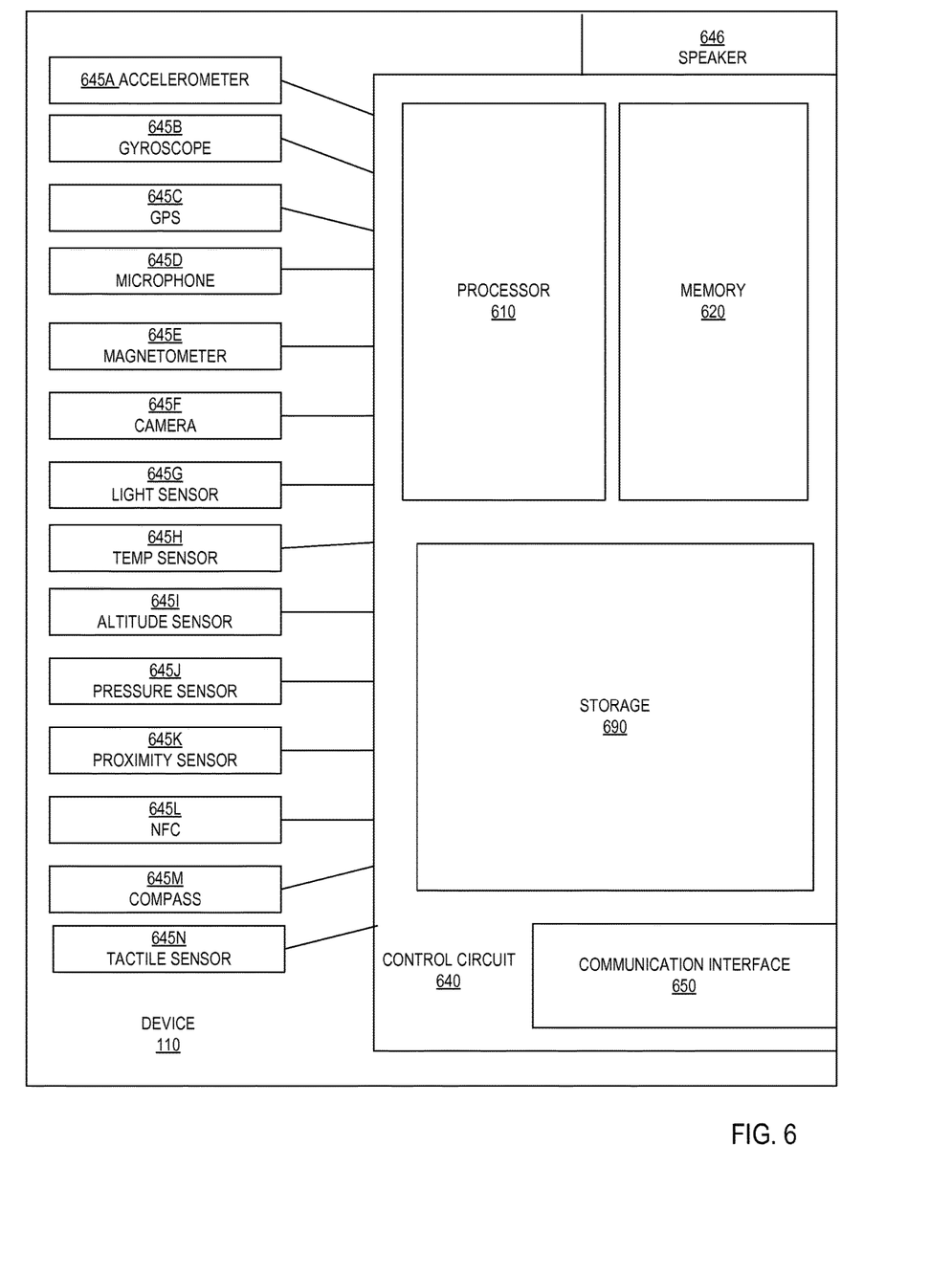
FIG. 6 depicts an exemplary implementation of a device in accordance with aspects and implementations of the present disclosure.

In certain implementations, user device(s) 110 can also include and/or incorporate various sensors and/or communications interfaces. Examples of such sensors include but are not limited to: accelerometer, gyroscope, compass, GPS, haptic sensors (e.g., touchscreen, buttons, etc.), microphone, camera, etc. Examples of such communication interfaces include but are not limited to cellular (e.g., 3G, 4G, etc.) interface(s), Bluetooth interface, WiFi interface, USB interface, NFC interface, etc. By way of illustration, FIG. 6 depicts one exemplary implementation of user device 110. As shown in FIG. 6, device 110 can include a control circuit 640 (e.g., a motherboard) which is operatively connected to various hardware and/or software components that serve to enable various operations, such as those described herein. Control circuit 640 can be operatively connected to processor 610 and memory 620. Processor 610 serves to execute instructions for software that can be loaded into memory 620. Processor 610 can be a number of processors, a multi-processor core, or some other type of processor, depending on the particular implementation. Further, processor 610 can be implemented using a number of heterogeneous processor systems in which a main processor is present with secondary processors on a single chip. As another illustrative example, processor 610 can be a symmetric multi-processor system containing multiple processors of the same type.

Memory 620 and/or storage 690 may be accessible by processor 610, thereby enabling processor 610 to receive and execute instructions stored on memory 620 and/or on storage 690. Memory 620 can be, for example, a random access memory (RAM) or any other suitable volatile or non-volatile computer readable storage medium. In addition, memory 620 can be fixed or removable. Storage 690 can take various forms, depending on the particular implementation. For example, storage 690 can contain one or more components or devices. For example, storage 690 can be a hard drive, a flash memory, a rewritable optical disk, a rewritable magnetic tape, or some combination of the above. Storage 690 also can be fixed or removable.

A communication interface 650 is also operatively connected to control circuit 640. Communication interface 650 can be any interface that enables communication between user device 110 and one or more external devices, machines, services, systems, and/or elements (including but not limited to those depicted in FIG. 1 and described herein). Communication interface 650 can include (but is not limited to) a modem, a Network Interface Card (NIC), an integrated network interface, a radio frequency transmitter/receiver (e.g., Bluetooth, cellular, NFC), a satellite communication transmitter/receiver, an infrared port, a USB connection, or any other such interfaces for connecting device 110 to other computing devices, systems, services, and/or communication networks such as the Internet. Such connections can include a wired connection or a wireless connection (e.g. 802.11) though it should be understood that communication interface 650 can be practically any interface that enables communication to/from the control circuit 640 and/or the various components described herein.

At various points during the operation of described technologies, device 110 can communicate with one or more other devices, systems, services, servers, etc., such as those depicted in FIG. 1 and/or described herein. Such devices, systems, services, servers, etc., can transmit and/or receive data to/from the user device 110, thereby preferably enhancing the operation of the described technologies, such as is described in detail herein. It should be understood that the referenced devices, systems, services, servers, etc., can be in direct communication with user device 110, indirect communication with user device 110, constant/ongoing communication with user device 110, periodic communication with user device 110, and/or can be communicatively coordinated with user device 110, as described herein.

Also preferably connected to and/or in communication with control circuit 640 of user device 110 are one or more sensors 645A-645N (collectively, sensors 645). Sensors 645 are various components, devices, and/or receivers that can be incorporated/integrated within and/or in communication with user device 110. Sensors 645 can be configured to detect one or more stimuli, phenomena, or any other such inputs, described herein. Examples of such sensors 645 include, but are not limited to, an accelerometer 645A, a gyroscope 645B, a GPS receiver 645C, a microphone 645D, a magnetometer 645E, a camera 645F, a light sensor 645G, a temperature sensor 645H, an altitude sensor 645I, a pressure sensor 645J, a proximity sensor 645K, a near-field communication (NFC) device 645L, a compass 645M, and a tactile sensor 645N. As described herein, device 110 can perceive/receive various inputs from sensors 645 and such inputs can be used to initiate, enable, and/or enhance various operations and/or aspects thereof, such as is described herein.

At this juncture it should be noted that while the foregoing description (e.g., with respect to sensors 645) has been directed to user device 110, various other devices, systems, servers, services, etc. (such as are depicted in FIG. 1 and/or described herein) can similarly incorporate the components, elements, and/or capabilities described with respect to user device 110. For example, retail representative device 135 may also incorporate one or more of the referenced components, elements, and/or capabilities. It should also be understood that certain aspects and implementations of various devices, systems, servers, services, etc., such as those depicted in FIG. 1 and/or described herein, are also described in greater detail below in relation to FIG. 5.

Retail management system 130 can be a rackmount server, a router computer, a personal computer, a portable digital assistant, a mobile phone, a laptop computer, a tablet computer, a camera, a video camera, a netbook, a desktop computer, a media center, any combination of the above, or any other such computing device capable of implementing the various features described herein. In certain implementations, retail management system can enable various types of retail purchases to be executed. For example, the retail management system can coordinate various types of in-venue purchases (e.g., purchasing refreshments at a venue during a performance/event). By way of further example, the retail management system can coordinate various types of ecommerce transactions, such as those that may be delivered to the purchaser (e.g., via mail) at a later date.

In certain implementations, retail management system 130 may be in communication with one or more retail representative devices 135. Such retail representative devices (e.g., smartphone, tablets, personal computers, etc.) may be operated by retail representatives that may be deployed throughout a venue (e.g., concession vendors that may travel through a venue selling refreshments, souvenirs, etc.). As shown in FIG. 1, such retail representative devices can be in periodic and/or constant communication with location determination devices 120. In doing so, the current location of the retail representative can be determined, such as is described herein.

Social network 140 can be one or more servers, computers, devices, etc., through which a social networking service (e.g., Facebook, LinkedIn, Twitter, etc.) are implemented. In certain implementations the social network can include one or more user profiles, such as profiles that may be associated with the users associated with user devices 110. Moreover, in certain implementations such a social network can define and maintain various relationships/connections between users, and can also serve to disseminate content (e.g., posts, etc.) provided by such users.

Venue experience management server 150 can be a rackmount server, a router computer, a personal computer, a portable digital assistant, a mobile phone, a laptop computer, a tablet computer, a netbook, a desktop computer, a media center, any combination of the above, or any other such computing device capable of implementing the various features described herein. In certain implementations, venue experience management server 150 can execute experience management engine 155 which can receive data from one or more of the components of system 100 and generate one or more instructions, recommendations, offers, etc., such as is described herein.

Seating management system 160 can be a server, computer, device, etc., that maintains and/or manages an inventory of tickets, such as with respect to a particular event at a particular venue. For example, seating management system can maintain a database that reflects which seats were/were not sold (and/or which tickets are/are not actually being used) for a particular event at a particular venue. Additionally, seating management system 160 can maintain data associated with various seats (or sections) within a venue. For example, seating management system 160 can maintain data pertaining to the price paid for the seats (which may reflect that the user is likely to be within a particular demographic), whether the seats were purchased by an individual and/or by a corporation, the frequency with which the seats are used and/or are used by a particular user, etc.

It should also be understood that the components referenced herein can be combined together or separated into further components, according to a particular implementation. Additionally, in some implementations, various components of a particular device may run on separate machines. Moreover, some operations of certain of the components are described in more detail below with respect various examples, illustrations, methods, and processes.

Described herein are various aspects of a method for venue experience management. The method is performed by processing logic that may comprise hardware (circuitry, dedicated logic, etc.), software (such as is run on a computing device such as those described herein), or a combination of both. In one implementation, the method is performed by one or more components depicted in FIG. 1, while in some other implementations, one or more operations may be performed by another machine.

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

As noted, in certain implementations a seating management system can maintain an inventory that reflects which seats are (and/or are not) sold with respect to a particular event (e.g., a game, concert, etc.) at a particular venue (e.g., a theatre, stadium, arena, etc.). Accordingly, upon determining that a particular user has entered the venue (e.g., at the start of a performance, game, etc.), the user can be prompted (e.g., with a message, notification, etc.) with an inquiry as to whether the user is interested in moving/upgrading their seats (e.g., to seats that are currently unsold). In certain implementations, the determination that the user has entered the venue (and/or the entrance through which they entered, their current location within the venue, etc.) can be determined based on a perception of/communication with user device 110 (e.g., based on one or more inputs associated with one or more sensors 645 of the device 110) in relation to one or more location determination devices 120 (e.g., WiFi access points, beacons, etc.).

In certain implementations, one or more auctions can be conducted with respect to such unoccupied seats. For example, with respect to particularly desirable seats (e.g., front row seats) that remain unsold or unused, an auction can be conducted (e.g., with respect to those users already present at the event) to enable the winner to switch or upgrade his/her seats.

Additionally, in certain implementations various aspects of a user's utilization of his/her current seats can be accounted for. For example, while a user may currently possess seats in a particular section/row of a venue, it can be determined (e.g., based on a perception of/communication with user device 110, such as based on input(s) associated with various sensors 645 of the device 110 as perceived in relation to one or more location determination devices 120) that the user may not actually be utilizing the referenced seats. For example, it can be determined that the user may be standing (or sitting) in another area of the venue. Accordingly, upon computing such a determination (e.g., that the user is not utilizing the seat(s) originally assigned to him/her), various actions, notifications, etc., can be initiated. For example, such a user (identified as, for example, standing in another area) can be asked if he/she wishes to select another seat (which may, for example, be closer to the current location of the user). By way of further example, the user determined not to be utilizing his/her seat can be prompted with the option to sell or transfer the rights to such seat to another attendee (in certain implementations the user may be able to receive compensation, rewards, credits, etc. for selecting such an option, such as a percentage of the revenues from a subsequent sale of the rights to the seat, or another gift or prize, e.g., for their participation).

Moreover, the user can also be notified of one or more social network connections, contacts, etc., that are also present at the same event/venue. In certain implementations, a notification/prompt to change/upgrade the user's seats can be made with respect to such social networking data. For example, upon determining (e.g., based on an analysis of various relationships, as may be maintained and/or provided by social network 140 in conjunction with the various technologies described herein) that one or more empty seats are present near the location of a friend of the user, a notification can be generated and/or provided, notifying the user, for example that " . . . your friend Michael S. is sitting in section 62—do you want to change your seats and sit with him?"

As noted, various retail/ecommerce applications can be implemented with respect to the described technologies. For example, before/during/after a performance, game, etc., the user may access an ecommerce portal (e.g., via a website or standalone app) through which the user can order souvenir items, etc., that can be shipped to the user's home. In doing so, the user may have access to the same merchandise as may be sold by merchandise vendors at the venue, yet the user does not have to contend with waiting in lines, holding/carrying the item during the event, etc.

Additionally, in certain implementations the described retail management system can coordinate the efforts of various retail representatives. For example, in one scenario the user can place an order (e.g., a food order, merchandise order, etc., such as via a website, standalone application, etc.), and such an order can be delivered to the seat (or current location) of the user by a retail representative (as determined, for example, based on a perception of/communication with user device 110, e.g., based on one or more inputs associated with one or more sensors 645 of the device 110, in relation to one or more location determination devices 120). In other scenarios, one or more suggestions can be generated and provided to the user, reflecting which item(s) may be closest to the user and thus have the shortest wait times.

Figure 3:
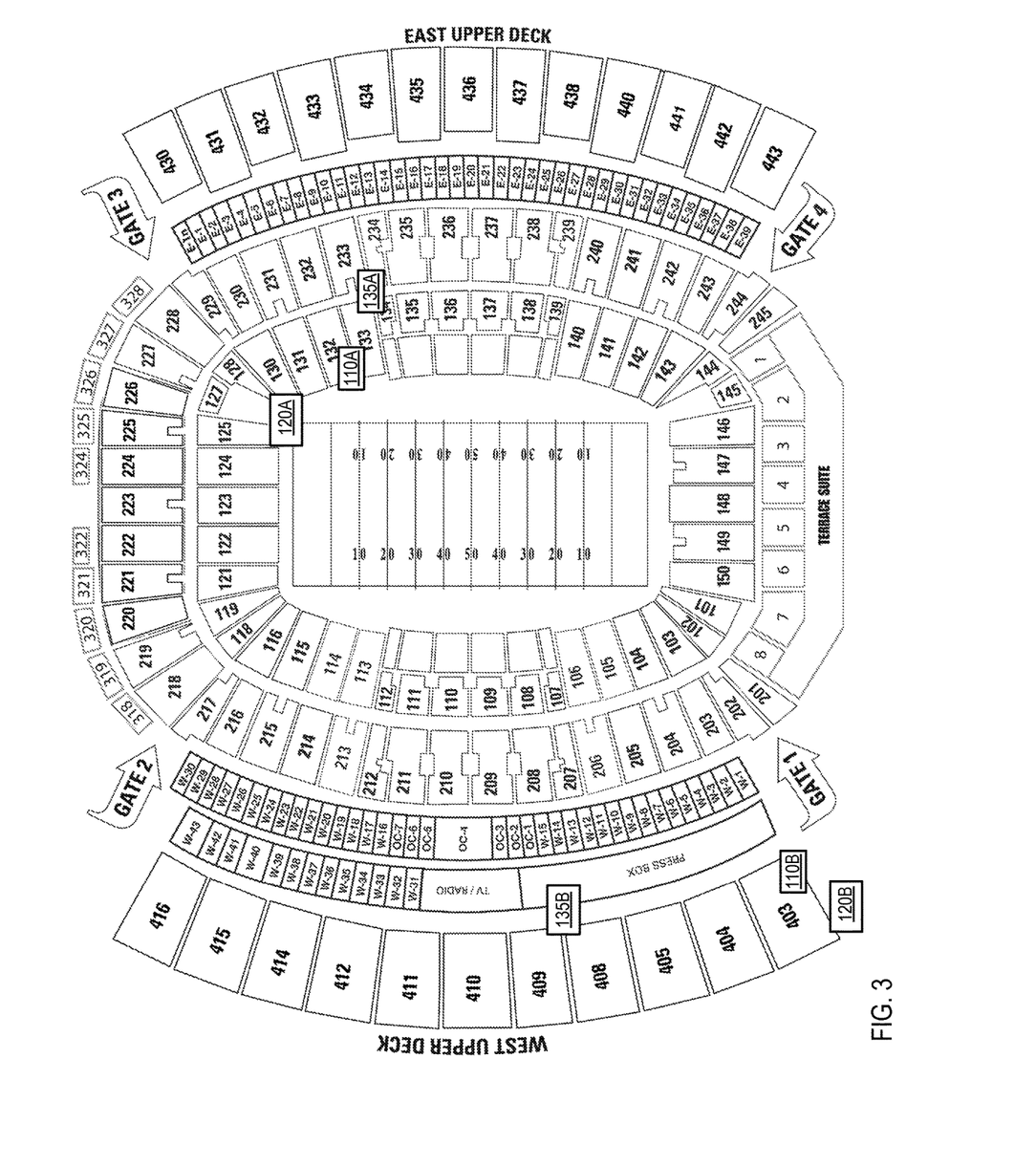
FIG. 3 depicts an exemplary stadium seating chart in accordance with one implementation of the present disclosure.

By way of illustration, FIG. 3 depicts an exemplary seating chart of a stadium in accordance with one embodiment described herein. It can be appreciated that location determination devices (120A, 120B) (e.g., WiFi access points, beacons, etc.) can be deployed throughout the stadium, which can be used to determine the current location of the user, such as based on a perception of/communication with user device 110 (e.g., based on one or more inputs associated with one or more sensors 645 of the device 110) in relation to one or more location determination devices 120 (e.g., WiFi access points, beacons, etc.). Accordingly, upon receiving an order from user 110A (who can be determined to be seated near section '130'), retail representative 135A, who can be determined (based on, for example, a perception of/communication with device 135A (e.g., based on one or more inputs associated with one or more sensors of the device) in relation to location determination device 120A) to be within a relatively close proximity to such a location, can be notified/instructed to fulfill the received order. Similarly, upon receiving an order from user 110B (who can be determined to be seated in section '403'), retail representative 135B, who can be determined to be within a relatively close proximity to such a location, can be notified/instructed to fulfill the received order.

In another scenario, a user can be notified of the proximity of a particular representative in real-time. For example, upon determining (e.g., in a manner described herein, such as by determining the respective locations of device 135A and 110A in relation to device 120A based on various perceptions and/or inputs received from/in relation to respective sensors of the devices 135A and/or 110A) that representative 135A (e.g., a beer vendor) is in relatively close proximity to or is approaching the user 110A, a notification can be provided to the user—e.g., "Are you thirsty? Cold beer is on its way . . . " Upon selecting/responding to such a notification, the user can provide order details (e.g., beer type, quantity, etc.) and execute payment prior to the arrival of the vendor. Thus, when the vendor arrives, the user can simply provide payment confirmation (e.g., a QR or any other such confirmation code or number) and the vendor can provide the purchased item, thereby avoiding the inefficiencies attendant with necessitating the vendor to receive the order and process the payment.

In certain implementations, the purchase history of a user (whether with respect to the event/venue itself and/or other purchases, such as via retailers such as Amazon, etc.) can be accounted for in generating suggestions for the user. For example, based on purchases that the user has made (e.g., products or items that they purchase frequently and/or can be determined to have already purchased), one or more suggestions (and/or promotions or coupons associated with them) can be generated and/or provided to the user. By way of further example, once a particular user has ordered the maximum number of alcoholic beverages (as defined by law, venue policy, etc.), the user may be prevented from ordering additional beverages.

In other implementations, even in scenarios in which there may be no prior data available with respect to the purchasing history or preferences of a particular user, one or more predictions or projections can be made based on data gathered from previous purchases of other users within the same seating section or price level. That is, it can be appreciated that certain purchasing tendencies or patterns may exist with respect to users sitting in comparable seats at an event. For example, in certain contexts it may be determined that users sitting at one price level may be more likely to purchase beer and hot dogs, while users sitting at another price level may be more likely to purchase wine and steak. Accordingly, based on a determination as to where a particular user is sitting, an appropriate purchase suggestion/notification/offer can be generated and provided. This can be particularly advantageous in scenarios in which many items are available for purchase at different areas (e.g., throughout a stadium) and the user may otherwise be required to seek out specific items at a vendor that may not be located near the user's seats.

Figure 2:
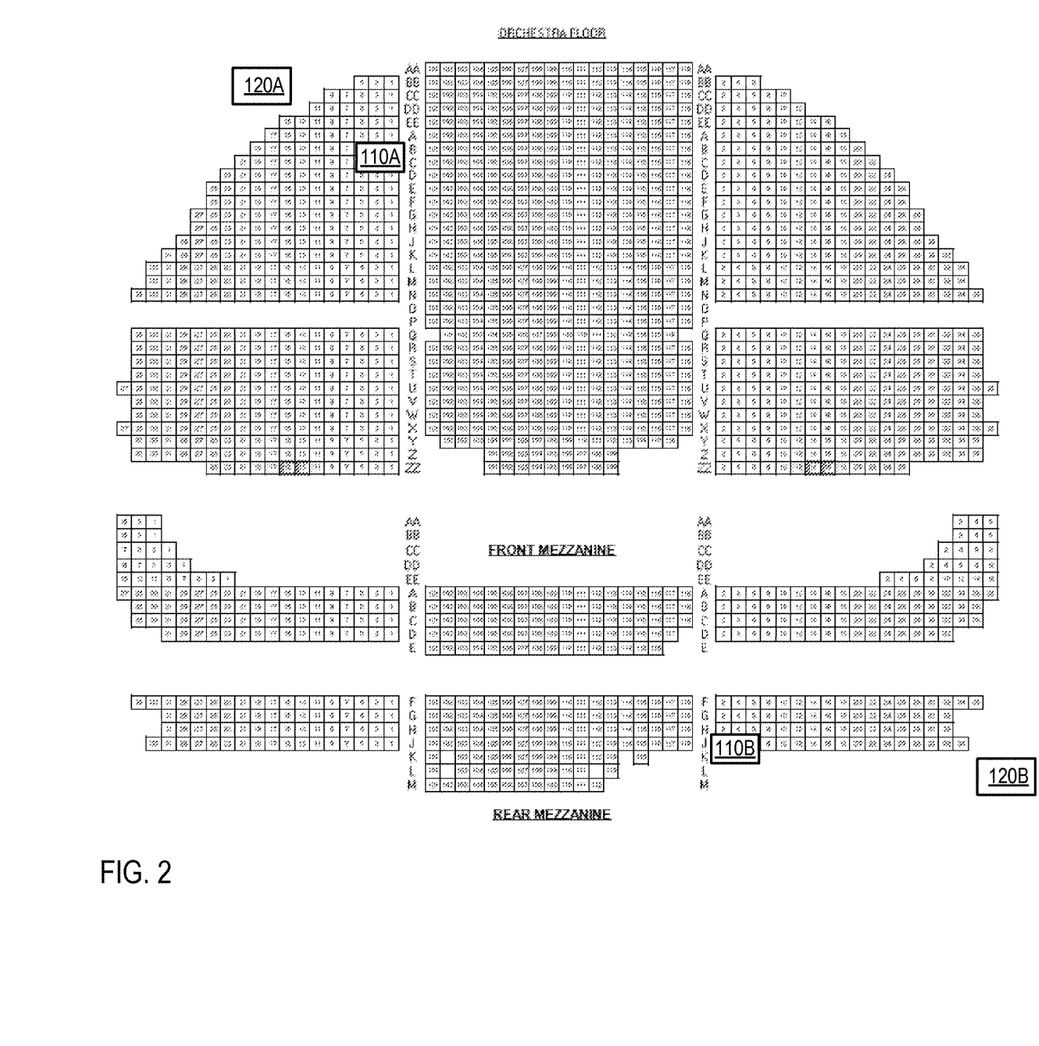
FIG. 2 depicts an exemplary theatre seating chart showing the location of various users within a theatre, in accordance with one implementation of the present disclosure.

By way of illustration, FIG. 2 depicts an exemplary theatre seating chart showing the location of various users (110A, 110B) within a theatre. It can be appreciated that location determination devices (120A, 120B) (e.g., WiFi access points, beacons, etc.) can be deployed throughout the theatre, which can be used to determine the current location of the user. Accordingly, user 110A (who can be determined to be seated towards the front of the 'orchestra' section) can be provided with one or more notifications, offers, etc., that may be likely to be more relevant to users seated in such a section (e.g., users that may have more disposable income, may be more frequent theatre goers, etc.) while user 110B (who can be determined to be seated towards the back of the 'mezzanine' section) can be provided with one or more notifications, offers, etc., that may be likely to be more relevant to users seated in such a section (e.g., users that may have relatively less disposable income, may be less frequent theatre goers, tourists, etc.).

In other scenarios, one or more purchasing options can be dynamically provided (or removed) based upon one or more events occurring with respect to the game, performance, etc., that is presently taking place at the venue.

By way of yet further example, one or more purchase opportunities or auctions can be generated in real-time with respect to an ongoing event. For example, auctions can be held during a sporting event for memorabilia associated with particular players or occurrences during a game. By way of illustration, an auction can be conducted during the game for the sneakers, helmet, jersey, etc., that are being worn by a particular player during the current game. By way of further illustration, memorabilia associated with a particular in-game moment (e.g., the bat that hit the winning home-run) can be sold in a comparable fashion. Other types of experiences (e.g., 'meet the cast' or backstage experiences) can also be sold or auctioned during an event. In doing so, users at an event can be presented with purchasing opportunities that may have additional significance to them (by virtue of being associated with an event that the user attended) and may otherwise be unavailable to the general public.

In certain implementations, the described technologies, including one or more of the various devices, systems, services, and server(s) depicted in FIG. 1, can be configured to account for the presence of a device and/or a status associated with it, in determining a location of a second device (and/or the manner in which the described management platform/service operates). That is, as depicted in FIG. 1 and further described herein, in certain implementations the location of user device 110 can be determined (e.g., based on one or more inputs associated with one or more sensors 645 of the device 110) in relation to one or more location determination devices 120 (e.g., WiFi access points, beacons, etc.), and such a location determination may, in certain implementations, pertain to a particular request (e.g., a user device in a particular location may want ice cream). Accordingly, while in certain implementations the location determination device(s) may continuously track/monitor the location of a retail representative device 135 (e.g., a retail representative that sells ice cream), in other implementations the location determination device(s) and/or retail management system and/or the representative devices can be configured not to compute/track such location(s) (and/or not to compute/track tm at the same manner, frequency, etc.) unless and until, for example, an affirmative request has been received (and/or a projection has been made indicating that such a request is likely to be forthcoming). In doing so, the operation of the system (including but not limited to server 150, location determination device(s) 120, and the various systems and/or devices depicted and/or described) can be improved/enhanced. For example, by not continuously monitoring the reference location(s), various power and efficiency savings can be achieved/realized, such as with respect to the various user devices, retail representative devices, and location determination devices, for example. Upon receiving the referenced request (e.g., a request for ice cream), various location determination operations can be initiated with respect to the respective devices, services, systems, etc. Accordingly, in such implementations, the operation of the referenced location determination technologies (e.g., in a particular area, e.g., within proximity of a particular location determination device) can be configured/initiated based on an action, query, etc., initiated by another device (e.g., a device within proximity to and/or otherwise associated with the referenced location and/or location determination device).

It should be further appreciated that in yet other implementations, various other inputs can be accounted for in determining the locations of various devices and/or initiating actions/operations in relation to them. By way of example, it can be appreciated that it may be advantageous to sell and/or promote certain items (e.g., food, souvenirs, etc.) to certain types of attendees (e.g., fans at a sporting event) in relation to certain events or occurrences that transpire during the event (e.g., after an exciting or critical play, e.g., a home run, while a team has the lead in the game, while a team is behind in a game, etc.). Accordingly, upon determining the incidence of such events, occurrences, etc., those retail representative devices (e.g., food, souvenir, beer, etc., vendors) that are determined to be in proximity to certain user devices (e.g., fans that are likely to be more receptive to purchasing certain items at that juncture in the game) can be notified and/or routed to the area(s) in which such users are (or are likely to be).

It should be noted that, in certain implementations, the incidence of the referenced occurrences can be computed and/or determined based on one or more sensor inputs, such as may be received via one or more sensors 645 of one or more devices. For example, inputs from a microphone (and/or inputs from an accelerometer/gyroscope, which may correspond to vibrations reflecting increased noise) can be processed to determine a noise level in a venue. Upon determining an increase in the noise level (and/or an increase in noise that can be determined to be likely to correspond to 'cheering'), retail representative devices determined to be in proximity to a particular location can be provided with a notification to move towards a particular section or location (as the attendees in such an area may be more likely to purchase souvenirs while the crowd is cheering). It should be understood that this is merely one example and that any number of other implementations (e.g., routing beer or food vendors to certain sections when it can be determined that a team is losing) are also contemplated.

Additionally, in certain implementations one or more notifications, instructions, etc., can be generated and/or provided based on the location of one device (e.g., a retail representative device) in relation to a prior location and/or path of travel associated with another device (e.g., a user device). That is, it can be appreciated that in certain implementations a location at which a user device was previously determined to be present (as determined, for example, based on input(s) associated with one or more sensors 645 of the device 110 as perceived/received by/in relation to one or more location determination devices), can be accounted for in projecting/determining what such a user may be likely to be interested in upon determination that such a device is present in another location (e.g., that they have returned to their seats). For example, upon determining that a user device was previously present at/in proximity to a bathroom location, and/or determining that such device has returned to their seat, a notification can be generated and/or provided to a retail representative device (e.g., a device determined to be relatively proximate to the referenced user device, as determined, for example, based on input(s) associated with one or more sensors of the retail representative device as perceived/ received by/in relation to one or more location determination devices), such as a notification that such a user may be more likely to be interested in purchasing additional food, beer, beverages, etc. In doing so, the prior location and/or location path (as may correspond, for example, to the user visiting the restroom and/or returning to their seat) can be accounted for in identifying a vendor that is currently proximate and which may have items, products, etc., that may be of current interest to the user.

Figure 4A:
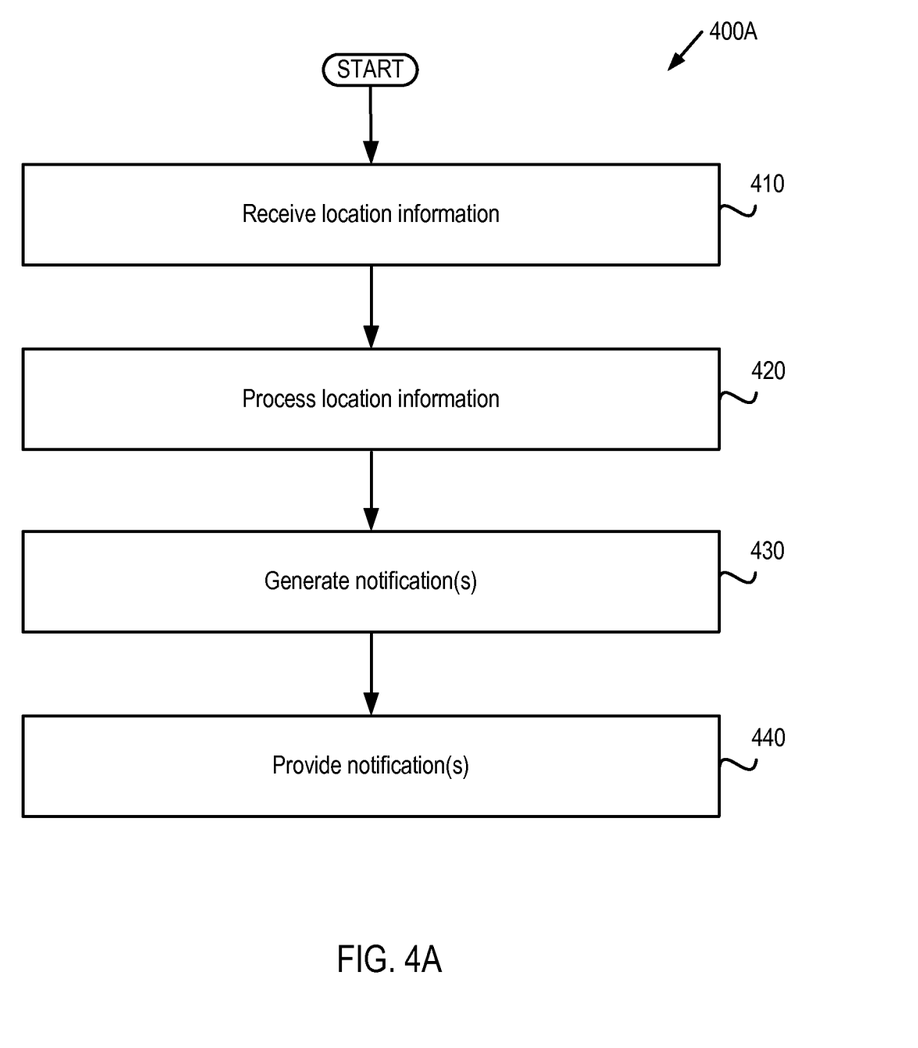
FIG. 4A depicts a flow diagram of aspects of a method for venue experience management in accordance with one implementation of the present disclosure.

As shown in FIG. 4A, method 400A begins at block 410, where location information can be received. In certain implementations, such information can be received with respect to the presence of a user device within a venue, such as in a manner described herein. In one aspect, block 410 is performed by one or more components depicted in FIG. 1, FIG. 5, and/or FIG. 6.

At block 420, the location information (such as that received at block 410) can be processed. In certain implementations, such information can be processed in relation to retail data and/or seating data. In doing so, various purchasing opportunities, such as those that are likely to be relevant to the user device, can be identified. In certain implementations, such opportunities can be identified based on the referenced location information, such as is described herein. In one aspect, block 420 is performed by one or more components depicted in FIG. 1, FIG. 5, and/or FIG. 6.

At block 430, one or more notifications can be generated. In certain implementations, such notifications can be generated with respect to the referenced purchasing opportunities (such as those identified at block 420). In one aspect, block 430 is performed by one or more components depicted in FIG. 1, FIG. 5, and/or FIG. 6.

At block 440, the notifications (such as those generated at block 430) can be provided to the user device. In one aspect, block 440 is performed by one or more components depicted in FIG. 1, FIG. 5, and/or FIG. 6.

Figure 4B:
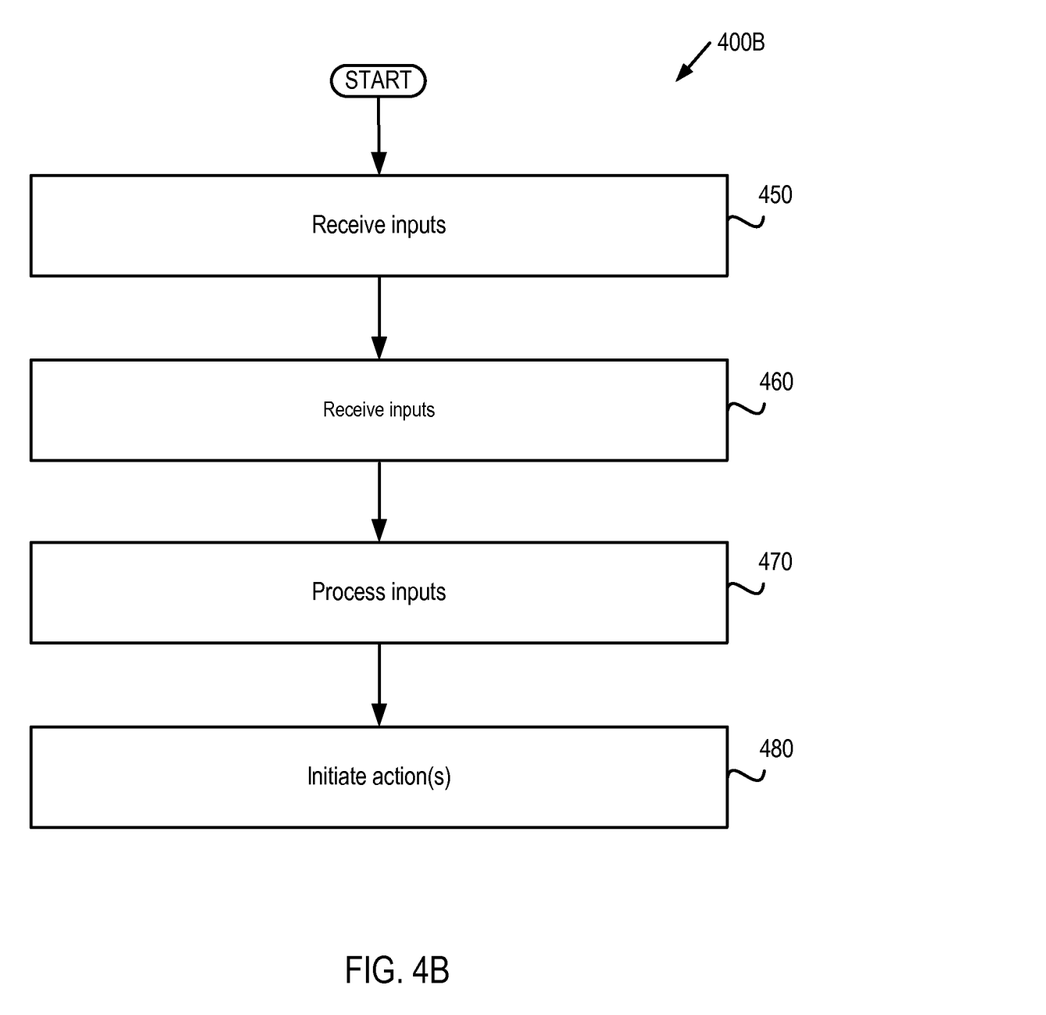
FIG. 4B depicts a flow diagram of aspects of a method for venue experience management in accordance with one implementation of the present disclosure.

As shown in FIG. 4B, method 400B shows further aspects of a method for venue experience management. At block 450 one or more inputs originating at one or more sensors of a first device are received at a communication interface of a location determination device. At block 460, one or more inputs originating at one or more sensors of a second device are received at the communication interface of the location determination device. At block 470, a processing device of the location determination device processes the one or more inputs originating at the one or more sensors of the first device in relation to the one or more inputs originating at the one or more sensors of the second device to determine a relative proximity of the first device in relation to the second device. In certain implementations, the one or more inputs originating at the one or more sensors of the first device can be processed in relation to the one or more inputs originating at the one or more sensors of the second device in conjunction with an identification of one or more relationships (e.g., social network relationships, as described herein). between a first user associated with the first device and a second user associated with the second device, to determine a relative proximity of the first device in relation to the second device and a relative compatibility of the first user and the second user. In certain implementations, the one or more inputs originating at the one or more sensors of the first device can be processed in relation to the one or more inputs originating at the one or more sensors of the second device in conjunction with a determination of a utilization of a resource (e.g., seats at a venue) associated with at least one of the first device or the second device, to determine a likelihood of a user associated with at least one of the devices exchanging the resource. At block 480, one or more actions are initiated based on the relative proximity of the first device in relation to the second device. Further aspects of the referenced operations are described herein.

Where location information can be received. In certain implementations, such information can be received with respect to the presence of a user device within a venue, such as in a manner described herein. In one aspect, block 410 is performed by one or more components depicted in FIG. 1, FIG. 5, and/or FIG. 6

It should also be noted that while the technologies described herein are illustrated primarily with respect to event venues (e.g., arenas, theatres, etc.), the described technologies can also be implemented in any number of additional or alternative settings or contexts (e.g., within retail establishments) and towards any number of additional objectives. It should be understood that further technical advantages, solutions, and/or improvements (beyond those described and/or referenced herein) may be enabled as a result of such implementations.

Figure 5:
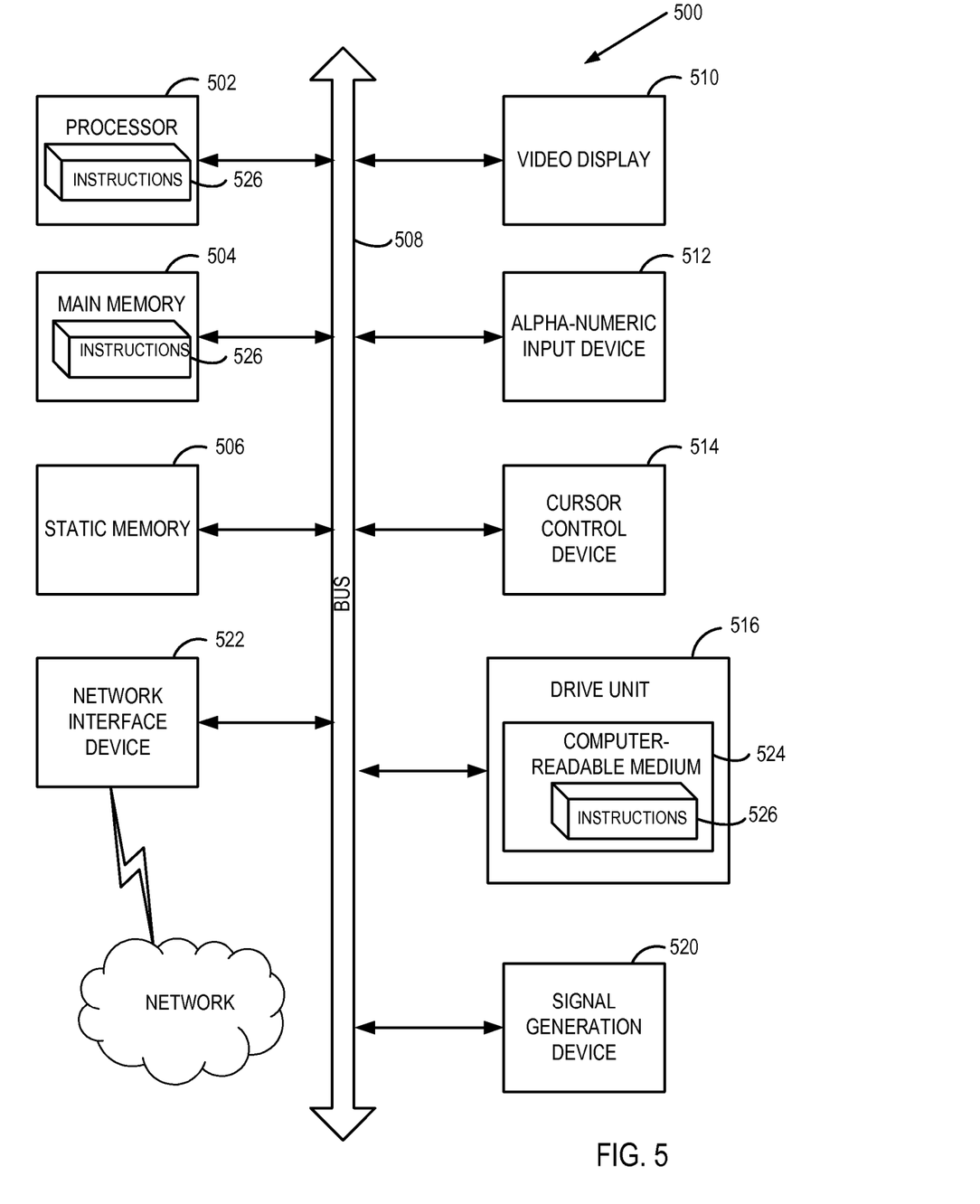
FIG. 5 depicts a block diagram of an illustrative computer system operating in accordance with aspects and implementations of the present disclosure.

FIG. 5 depicts an illustrative computer system within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing system (processor) 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 516, which communicate with each other via a bus 508.

Processor 502 represents one or more processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions 526 for performing the operations and steps discussed herein.

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 516 may include a computer-readable medium 524 on which is stored one or more sets of instructions 526 which may embody any one or more of the methodologies or functions described herein. Instructions 526 may also reside, completely or at least partially, within the main memory 504 and/or within the processor 502 during execution thereof by the computer system 500, the main memory 504 and the processor 502 also constituting computer-readable media. Instructions 526 may further be transmitted or received over a network via the network interface device 522.

While the computer-readable storage medium 524 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "processing," "requesting," "correlating," "selecting," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Aspects and implementations of the disclosure also relate to an apparatus for performing the operations herein. In certain implementations, this apparatus may be specially constructed for the required purposes. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It should be understood that the present disclosure is not described with reference to any particular programming language. It will be appreciated that a variety of programming languages may be used to implement the teachings of the disclosure as described herein.

It is to be understood that the above description is intended to be illustrative, and not restrictive. Many other embodiments will be apparent to those of skill in the art upon reading and understanding the above description. Moreover, the techniques described above could be applied to other types of data instead of, or in addition to those referenced herein. The scope of the disclosure should, therefore, be determined with reference to the appended claims, along with the full scope of equivalents to which such claims are entitled.

What is claimed is:

1. A method comprising:
receiving a request associated with a first device;
receiving, in conjunction with the request associated with the first device, an input originating at a sensor of the first device;
receiving, in response to receipt of the request associated with a first device, an input originating at a sensor of a second device;
processing the input originating at the sensor of the first device in relation to the input originating at the sensor of the second device in conjunction with a determination of a utilization of a resource associated with at least one of the first device or the second device to determine (a) a likelihood of a user associated with at least one of the devices exchanging the resource, and (b) a relative proximity of the first device in relation to the second device; and
initiating one or more actions with respect to fulfillment of the request associated with the first device based on the relative proximity of the first device in relation to the second device.

2. The method of claim 1, wherein the sensor of the first device comprises at least one of:
an accelerometer, a GPS receiver, a microphone, a magnetometer, a camera, a light sensor, a temperature sensor, an altitude sensor, a pressure sensor, a proximity sensor, a tactile sensor, an NFC device, a WiFi interface, or a Bluetooth interface.

3. The method of claim 1, wherein the sensor of the second device comprises at least one of:
an accelerometer, a GPS receiver, a microphone, a magnetometer, a camera, a light sensor, a temperature sensor, an altitude sensor, a pressure sensor, a proximity sensor, a tactile sensor, an NFC device, a WiFi interface, or a Bluetooth interface.

4. The method of claim 1, wherein processing the input originating at the one or more sensors of the first device in relation to the input originating at the sensor of the second device comprises processing the input originating at the sensor of the first device in relation to the input originating at the sensor of the second device in conjunction with an identification of one or more relationships between a first user associated with the first device and a second user associated with the second device, to determine a relative proximity of the first device in relation to the second device and a relative compatibility of the first user and the second user.

5. The method of claim 4, wherein initiating one or more actions comprises initiating one or more actions based on the relative proximity of the first device in relation to the second device and the relative compatibility of the first user and the second user.

6. The method of claim 1, wherein the processing of the input originating at the sensor of the first device is initiated based on the input originating at the sensor of the second device.

7. The method of claim 1, wherein processing the input originating at the sensor of the first device in relation to the input originating at the sensor of the second device comprises processing the input originating at the sensor of the first device in relation to the input originating at the sensor of the second device in conjunction with an identification of one or more relationships between a first user associated with the first device and a second user associated with the second device, to determine a relative compatibility of the first user and the second user.

8. The method of claim 1, wherein processing the input originating at the sensor of the first device in relation to the input originating at the sensor of the second device comprises processing the input originating at the sensor of the first device in relation to the input originating at the sensor of the second device in conjunction with an identification of one or more relationships between a first user associated with the first device and a second user associated with the second device, to determine a relative proximity of the first device in relation to the second device.

9. A system comprising:
a processing device; and
a memory coupled to the processing device and storing instructions that, when executed by the processing device, cause the system to perform operations comprising:
receiving a request associated with a first device;
receiving in conjunction with the request associated with the first device, an input originating at a sensor of the first device;
receiving, in response to receipt of the request associated with a first device, an input originating at a sensor of a second device;
processing the input originating at the sensor of the first device in relation to the input originating at the sensor of the second device in conjunction with a determination of a utilization of a resource associated with at least one of the first device or the second device to determine (a) a likelihood of a user associated with at least one of the devices exchanging the resource, and (b) a relative proximity of the first device in relation to the second device; and
initiating one or more actions with respect to the fulfillment of the request associated with the first device based on the relative proximity of the first device in relation to the second device.

10. The system of claim 9, wherein the sensor of the first device comprises at least one of:
an accelerometer, a GPS receiver, a microphone, a magnetometer, a camera, a light sensor, a temperature sensor, an altitude sensor, a pressure sensor, a proximity sensor, a tactile sensor, an NFC device, a WiFi interface, or a Bluetooth interface.

11. The system of claim 9, wherein the sensor of the second device comprises at least one of:
an accelerometer, a GPS receiver, a microphone, a magnetometer, a camera, a light sensor, a temperature sensor, an altitude sensor, a pressure sensor, a proximity sensor, a tactile sensor, an NFC device, a WiFi interface, or a Bluetooth interface.

12. The system of claim 9, wherein processing the input originating at the sensor of the first device in relation to the input originating at the sensor of the second device comprises processing the input originating at the sensor of the first device in relation to the input originating at the sensor of the second device in conjunction with an identification of one or more relationships between a first user associated with the first device and a second user associated with the second device, to determine a relative proximity of the first device in relation to the second device and a relative compatibility of the first user and the second user.

13. The system of claim 12, wherein initiating one or more actions comprises initiating one or more actions based on the relative proximity of the first device in relation to the second device and the relative compatibility of the first user and the second user.

14. The system of claim 9, wherein the processing of the input originating at the sensor of the first device is initiated based on the input originating at the sensor of the second device.

15. The system of claim 9, wherein processing the input originating at the sensor of the first device in relation to the input originating at the sensor of the second device comprises processing the input originating at the sensor of the first device in relation to the input originating at the sensor of the second device in conjunction with an identification of one or more relationships between a first user associated with the first device and a second user associated with the second device, to determine a relative compatibility of the first user and the second user.

16. The system of claim 9, wherein processing the input originating at the sensor of the first device in relation to the input originating at the sensor of the second device comprises processing the input originating at the sensor of the first device in relation to the input originating at the sensor of the second device in conjunction with an identification of one or more relationships between a first user associated with the first device and a second user associated with the second device, to determine a relative proximity of the first device in relation to the second device.

17. A non-transitory computer readable medium having instructions encoded thereon that, when executed by a processing device, cause the processing device to perform operations comprising:
    receiving a request associated with a first device;
    receiving an input originating at a sensor of the first device;
    receiving, in response to receipt of the request, an input originating at a sensor of a second device;
    processing the input originating at the sensor of the first device in relation to the input originating at the sensor of the second device in conjunction with a determination of a utilization of a resource associated with at least one of the first device or the second device to determine (a) a likelihood of a user associated with at least one of the devices exchanging the resource, and (b) a relative proximity of the first device in relation to the second device; and
    initiating one or more actions with respect to the fulfillment of the request associated with the first device based on the relative proximity of the first device in relation to the second device.

18. The non-transitory computer readable medium of claim 17, wherein processing the input originating at the sensor of the first device in relation to the input originating at the sensor of the second device comprises processing the input originating at the sensor of the first device in relation to the input originating at the sensor of the second device in conjunction with an identification of one or more relationships between a first user associated with the first device and a second user associated with the second device, to determine a relative compatibility of the first user and the second user.

19. The non-transitory computer readable medium of claim 17, wherein processing the input originating at the sensor of the first device in relation to the input originating at the sensor of the second device comprises processing the input originating at the sensor of the first device in relation to the input originating at the sensor of the second device in conjunction with an identification of one or more relationships between a first user associated with the first device and a second user associated with the second device, to determine a relative proximity of the first device in relation to the second device and a relative compatibility of the first user and the second user.

20. The non-transitory computer readable medium of claim 19, wherein initiating one or more actions comprises initiating one or more actions based on the relative proximity of the first device in relation to the second device and the relative compatibility of the first user and the second user.

\* \* \* \* \*